United States Patent [19]

Guarneri

[11] Patent Number: 5,573,796
[45] Date of Patent: Nov. 12, 1996

[54] METHOD OF MAKING SHEET DOUGH FOR LONG-LIFE FRESH PASTA PRODUCTS

[75] Inventor: Roberto Guarneri, Parma, Italy

[73] Assignee: Barilla G. E R. F.LLI - Societa per Axioni, Parma, Italy

[21] Appl. No.: 553,308

[22] Filed: Jul. 17, 1990

[30] Foreign Application Priority Data

Feb. 12, 1990 [IT] Italy .................... 19344-A/90

[51] Int. Cl.⁶ .................................... A21D 2/02
[52] U.S. Cl. ................ 426/94; 426/502; 426/557; 426/451
[58] Field of Search ............... 426/94, 557, 502, 426/451

[56] References Cited

U.S. PATENT DOCUMENTS 3,804,637  4/1974  Rejsa ..................... 99/450.1
4,529,609  7/1985  Gaehring et al. .......... 426/557
4,675,199  6/1987  Hsu ..................... 426/502
4,898,744  2/1990  Liggett et al. ........... 426/557

FOREIGN PATENT DOCUMENTS 0203321  12/1986  European Pat. Off. .
0275838  7/1988  European Pat. Off. .

OTHER PUBLICATIONS

Samuel A. Matz, PH.D., Equipment For Bakers, Pan–Tech International, Inc. 1988, pp. 154–157.

*Primary Examiner*—Jeanette Hunter
*Attorney, Agent, or Firm*—Sughrue, Mion, Zinn, Macpeak & Seas

[57] ABSTRACT

A sheet of a fresh dough formed from a dough stock incorporating up to 4% salt is subjected to cross rolling. The fresh pasta product obtained from such sheet dough has extended shelf-life while retaining the original organoleptic properties unaltered.

5 Claims, 1 Drawing Sheet

METHOD OF MAKING SHEET DOUGH FOR LONG-LIFE FRESH PASTA PRODUCTS

BACKGROUND OF THE INVENTION

This invention relates generally to a method of preparing long-life fresh pasta products on a commercial scale, such as but not solely fresh pasta products from durum wheat flour and eggs, with or without a filling. Where a filling is provided, this would be of the general kind including meat, cheese, bread, vegetables, herbs, spices, etc. More specifically, the invention concerns an improved method of making sheet dough for use in the production of fresh pasta products, with or without a filling.

Throughout the ensuing description and the appended claims, the term "fresh pasta" applies to any pasta products, whether stuffed or otherwise, made on a commercial scale to have a water content in the 25% to 30% range by weight, thereby it will be soft and resilient to the touch like fresh homemade pasta.

It is a well-recognized fact that shortly (2–3 days) after preparation, fresh pasta products will undergo substantial alteration of a bacterial and chemical type, resulting in an unacceptable drastic deterioration of its original organoleptic features, and above all, the appearance of toxic agents. Contamination of fresh pasta is due both to the ingredients employed and the manipulation to which it is subjected during the production process.

Also well known is the fast deterioration of its original organoleptic properties, that is taste, flavor and appearance.

Currently available on the market are products the long-life features (wholesomeness and retention of the original organoleptic properties) features whereof are achieved by cold processing, in particular by freezing freshly prepared foodstuff to −20° C./−25° C. or cooling within the range of 2° to 4° C.

However, this prior procedure has some well recognized complications due to the need for maintaining a cold chain which encompasses production, packaging, storage, transportation, display for sale, under ambient conditions of temperature and humidity which are neither easy to maintain not to control. Thus, the problems are not only of an economical nature, but also technical and sanitary.

SUMMARY OF THE INVENTION

This same Applicant has proposed and tested an alternative procedure based essentially on salting the start dough and suitably heat processing the product as soon as prepared from said dough. This procedure is fully described in Italian Patent No. IT 1199849 by this Applicant and issued on Jan. 5, 1989 and incorporated hereto for reference.

While on the one side this prior procedure can yield fresh pasta products having characteristics which are better than satisfactory from the standpoint of their wholesomeness and preservability over time at ambient temperature (shelf-life), on the other side, it has been found that it could be improved upon to afford increased production output.

In fact, it has been found that, using the above procedure, during the preparation of sheet dough from a salted stock, and through subsequent steps of mechanical manipulation of the same, such as in the course of operations to form and fold over sheet dough sections around a filling to make tortellini, ravioli, etc., tears, voids, and the like material discontinuities may occur which, even if modest in size, still make it necessary that the affected product be discarded.

Since sheet dough processed from dough which has been prepared from the same ingredients, but not salted, exhibits no such drawback as the one noted above, while being subjected to the same mechanical stresses, and since it is well known that the toughness and cohesion viscoelastic characteristics of a dough stock of the kind under consideration and of the sheet dough yielded thereby are tied substantially to the gluten links they include, it has been thought that said problem (formation of tears and the like) is indeed attributable to the presence of salt in the dough stock.

It is judged that the salt added to the dough (at a moisture content of 30 to 32%) fully hydrolyzes, and that the ions released react with some of the functional groups of the gluten chains to combine therewith and neutralize their activeness. As a result, the gluten chains, depleted of a number of active sites, would originate a link or structure with a reduced degree of cross-linking, and hence, reduced strength.

The problem that underlies this invention is to provide a method of preparing fresh pasta products, with or without a filling, having long life features at ambient temperature, which can successfully overcome the above-noted drawbacks while retaining the recognized advantages of the cited prior art.

This problem is solved according to the invention by a method comprising the sequential steps of:

providing a dough stock from ingredients which include durum wheat flour, water, eggs, and salt, said dough stock incorporating salt in an amount between 2.5% and 4% by weight and having a water content in the 30% to 32% range;

forming from said dough stock a web of sheet dough whose fibers are mainly oriented in the longitudinal direction thereof;

lapping said sheet dough into plural overlaid layers; and rolling and calibrating said overlaid layers in a cross direction to the main orientation of the fibers in said sheet dough.

The salted sheet dough thus obtained showed no tears either during its mechanical processing or on the occasion of subsequent forming into such end products as tortellini and the like. It is therefore considered that by cross rolling the plurality of overlaid layers of "salted" sheet dough, a higher number of "encounters and crossings" is achieved statistically between gluten chains, thereby at least the same degree of cross-linking is re-established as the sheet dough would have if formed from a salt-free dough stock.

This benefit is confirmed, moreover, by the improved cooking characteristics of products made of the salted sheet dough according to this invention.

The invention features and advantages will be more clearly apparent from the following detailed description, given by way of illustration only with reference to the accompanying drawings, where:

DETAILED DESCRIPTION OF THE INVENTION

A dough stock was prepared from durum wheat flour, eggs (four eggs per kilogram flour), salt to an amount within the 3% to 5% range by weight of the durum wheat flour, and a sufficient amount of water. The resulting dough had solid-to-plastic consistency and a moisture content of 32%.

This dough stock was worked into a sheet which showed to be resilient solid-like with a moisture content of 30% and fibers mainly oriented along the longitudinal direction of the sheet.

Figure 1:
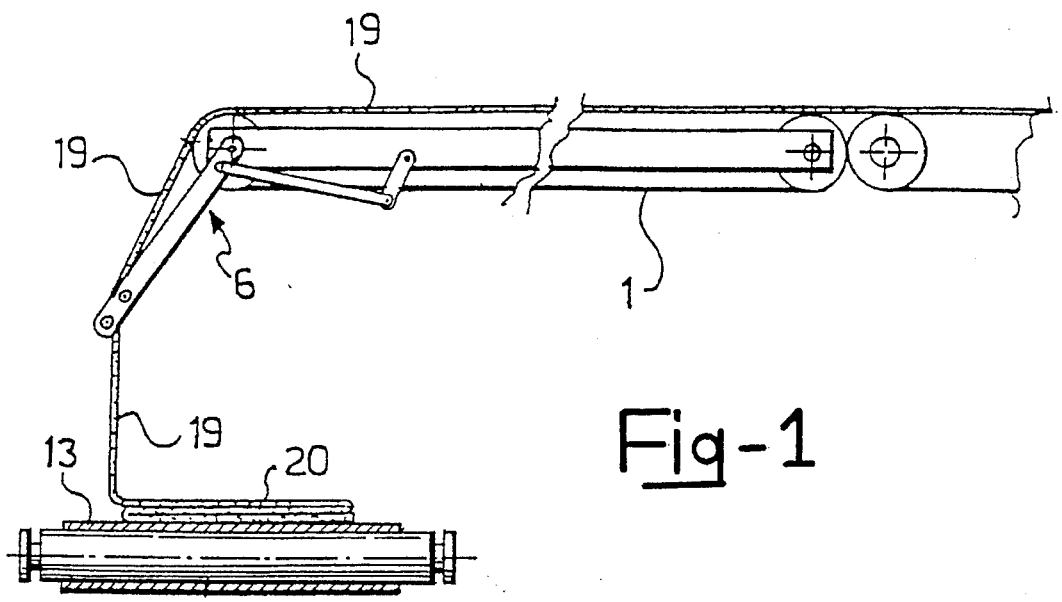
FIGS. 1 and 2 are a side view and a front view, respectively, of an apparatus for implementing the method of this invention.
Figure 2:
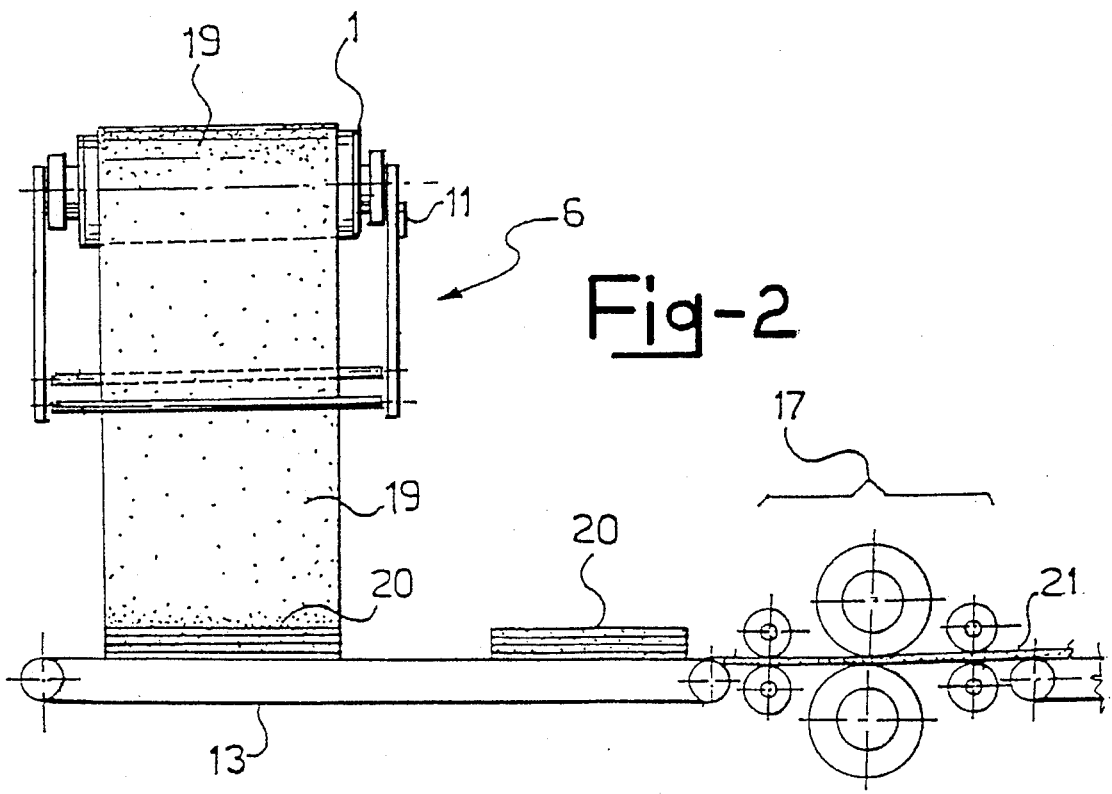

This sheet dough, indicated at 19 in FIGS. 1 and 2, was then taken to by a conveyor 1 to a lapper device 6. Through this lapper device, the sheet dough 19 was laid into plural overlaid layers on a conveyor belt 13, and the plurality of overlaid layers, essentially forming a "pack" 20, was delivered on the same conveyor 13 to a rolling/calibrating unit 17.

The plurality of overlaid layers of such a pack was roll processed for several times, and finally calibrated to yield a new sheet dough 21 having a predetermined thickness. It should be noted that, in accordance with this invention, the rolling and calibrating steps were carried out in a cross direction to the direction of lay of the fibers in the sheet dough 19 such as produced.

The sheet 19 lapping on the conveyor 13 was performed by successively folding the same over, with the folds oriented transversely to the orientation of the sheet dough fibers and for a predetermined number of times to suit particular organoleptic and cooking characteristics required of the type of pasta product into which the sheet dough was being worked by the method of this invention.

The sheet 21 was then used to form pasta products to be stored fresh, such as tortellini, using a conventional filling. During the sheet forming of operations, or rather forming portions thereof, and its gathering around a predetermined amount of a suitable filling, no tears or cracks or the like faults were to be observed in the sheet dough.

The tortellini (like other products) formed from the sheet 21 had a moisture content of 30%, and they all had the features of resilient solid bodies, soft to the touch. The resulting pasta products were later subjected to heat pasteurization processing at a temperature in the 90° to 102°–103° C. range for a time period varying between 105 and 120 seconds. At the end of the process, the moisture content of the tortellini (like that of the other pasta products was still of approximately 30%.

Subsequently, these products were subjected to partial drying in an environment at a temperature of about 80°–85° C., and at a relative humidity of 23%. The latter treatment was applied for 5–7 minutes, and thereafter, the moisture content of the pasta products showed to have dropped down to 25% with a water activity Aw of 0.85–0.87.

The products were then fed into a packaging station where they were packaged into appropriate containers in an inert gas environment, which containers were then sealed, they being formed from a suitable, substantially oxygen-impervious material. Following heat stabilization in a microwave oven to about 90° C. for 8–10 minutes, the packaged product was handed to storage, whence samples were picked up and tested for their moisture content, water activity, and bacterial charge. The test results were better than satisfactory.

I claim:

1. Method of making sheet dough for use in the production of long-life fresh pasta products, comprising the sequential steps of:

providing a dough stock from ingredients which include durum wheat flour and eggs, and incorporating salt therein in an amount between 2.5% and 4% by weight and providing said dough stock with a water content in the 30% to 32% range;

forming from said dough stock a web of sheet dough whose fibers are mainly oriented in the longitudinal direction thereof;

lapping said sheet dough into plural overlaid layers; and rolling and calibrating said overlaid layers in a cross direction to the main orientation of the fibers in said sheet dough such that said cross rolled sheet dough is free of tears and cracks.

2. A foodstuff stock intended for making long-like fresh pasta products, consisting of a sheet dough formed by the method of claim 1.

3. Method of making long-life fresh pasta products, comprising the sequential steps of:

providing a dough stock from ingredients which include durum wheat flour and eggs, and incorporating salt, therein in an amount between 2.5% and 4% by weight, and providing said dough stock with a moisture content of 30–32%;

forming from said dough stock a web of sheet dough whose fibers are mainly oriented in the longitudinal direction thereof;

lapping said sheet dough into plural overlaid layers;

rolling and calibrating said overlaid layers in a cross direction to the main orientation of the fibers in said sheet dough to yield a new web of sheet dough;

forming pasta products which may include a filling;

pasteurizing said pasta products;

partially drying the pasteurized products to a moisture content of about 25% and a water activity Aw below 0.87;

packaging the products under an inert gas atmosphere inside substantially oxygen-impervious containers; and heat stabilizing the packaged products.

4. Method according to claim 3, characterized in that said step of heat stabilizing the packaged products is carried out at a temperature in the 90° to 100° C. range for a time period varying between 2 and 10 minutes.

5. Method according to claim 4, characterized in that said heat stabilization step is carried out using high or very high frequency electromagnetic energy.

* * * * *